United States Patent
Fröjdh et al.

(10) Patent No.: US 6,724,818 B1
(45) Date of Patent: Apr. 20, 2004

(54) ALTERNATIVE BLOCK ORDERS FOR BETTER PREDICTION

(75) Inventors: Per Fröjdh, Stockholm (SE); Rickard Sjöberg, Tumba (SE); Torbjörn Einarsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 656 days.

(21) Appl. No.: 09/635,711

(22) Filed: Aug. 9, 2000

Related U.S. Application Data

(60) Provisional application No. 60/218,973, filed on Jul. 17, 2000.

(51) Int. Cl.$^7$ ................................................. H04N 7/12
(52) U.S. Cl. ........................ 375/240.07; 375/240.12; 375/240.24
(58) Field of Search .................. 375/240.24, 240.2, 375/240.07, 240.02, 240.12, 240.14; 348/206

(56) References Cited

U.S. PATENT DOCUMENTS

| | | | | |
|---|---|---|---|---|
| 4,754,336 A | | 6/1988 | Nishizawa | 358/261 |
| 5,532,747 A | * | 7/1996 | Yoon et al. | 375/240.17 |
| 5,675,387 A | * | 10/1997 | Hoogenboom et al. | 375/240.15 |
| 5,953,506 A | * | 9/1999 | Kalra et al. | 709/231 |
| 5,959,674 A | | 9/1999 | Jang et al. | 348/403 |
| 6,205,181 B1 | * | 3/2001 | Hu et al. | 375/240.26 |
| 6,426,975 B1 | * | 7/2002 | Nishi et al. | 375/240.13 |

FOREIGN PATENT DOCUMENTS

| | | |
|---|---|---|
| EP | 0 633 703 A2 | 1/1995 |
| EP | 0 833 520 A2 | 4/1998 |
| EP | 0 833 521 A2 | 4/1998 |
| EP | 0 999 551 A1 | 5/2000 |
| WO | WO 91/14339 | 9/1991 |

OTHER PUBLICATIONS

*Improvements in DCT Based Video Coding*, by A. Puri, R.L. Schmidt and B.G. Haskell, SPIE vol. 3024, Feb. 12, 1997, XP000199866.

*A Method of Adaptive Prediction in the Transform Domain*, by Sheng–Mei Shen and Thiow–Keng Tan, vol. 143, pp. 709–712, Sep. 10, 1997, XP000199865.

* cited by examiner

*Primary Examiner*—Chris Kelley
*Assistant Examiner*—Dave Czekaj

(57) ABSTRACT

A method and apparatus for maximizing the prediction utility of previously encoded macroblocks by adjusting the scanning order of the blocks within a macroblock to be encoded is disclosed. Where no previously encoded blocks are available above the macroblock being encoded, the alternative scanning orders allow for maximum utility of previously encoded blocks located to the left of the macroblock being encoded. Where no previously encoded blocks are available either above or to the left of the macroblock being encoded, the alternative scanning orders allow for maximum utility of information from blocks that are presently being encoded in the same macroblock. The particular scanning order used may be signaled implicitly based on the location of the macroblock being encoded, or it may be signaled explicitly by code words within the bitstream containing the encoded block information. In the case where the scanning order is to be signaled explicitly by a code word, the optimal scanning order may be chosen from among one or more scanning orders for any particular picture and macroblock.

22 Claims, 4 Drawing Sheets

ALTERNATIVE BLOCK ORDERS FOR BETTER PREDICTION

RELATED APPLICATIONS

This application claims priority from and incorporates herein by reference the entire disclosure of U.S. Provisional Application Ser. No. 60/218,973, filed Jul. 17, 2000.

FIELD OF THE INVENTION

The present invention is related to compression of digital video signals and, more particularly, to a method and apparatus for employing alternative block scanning orders in order to improve the efficiency of the compression.

BACKGROUND OF THE INVENTION

Recent developments in communication systems and signal compression technology have made point-to-point video communication a technical possibility. The various applications of point-to-point video communication may be classified according to the amount of bandwidth available for transmission of the video signals. For example, commercially available videoconferencing systems using dedicated lines have a few hundred kbps (kilobits per second) of bandwidth available for signal transmission. In contrast, a personal communication device such as a videotelephone using ordinary telephone lines or wireless channels only has about 20 kbps of bandwidth available. Therefore, some compression of the video signals is necessary for transmission using such personal communication devices.

In general, video signal compression refers to the art of more or less transparently minimizing the amount of bandwidth required to transmit the information in the video signal. Compression is made possible by virtue of a high degree of redundancy both within each image frame and between consecutive image frames of the video signal. In other words, one image frame may differ only slightly from the preceding image frame(s), or one portion of an image frame may differ only slightly from another portion of the same image frame. The redundancy allows certain portions of an image frame to be extrapolated or predicted based on the preceding image frames or the preceding portions within the same image frame. Consequently, the amount of information in the video signal that actually needs to be transmitted may be substantially reduced.

A number of encoding standards, such as ITU-T Recommendation H.263 and ISO Standard MPEG-4, have been developed to help standardize the transmission of video signals over low bandwidth media. Under such standards, each frame of the video signal is divided into smaller regions called macroblocks. For example, referring to FIG. 1, each frame 10 of a QCIF (Quarter Common Interface Format) image is divided into 9×11 macroblocks 12, each consisting of 16×16=256 pixels. In present standards, each macroblock is coded in units of 8×8 pixel blocks, or 4×8 pixel blocks in some interlaced modes. The block size is normally determined from the size of transform which is 8×8 DCT (Discrete Cosine Transform) in most cases. However, in the work towards future standards, the usage of smaller blocks like 4×4 pixels and other transforms like 4×4 Hadamard transform has been suggested. Since the effect of different block scanning orders is better visualized using 4×4 pixel blocks, this case will be used as an example in FIG. 1, where it is shown that each macroblock 12 defines an area of 4×4 blocks 14, each block consisting of 4×4 =16 pixels 16.

In most encoding schemes, the macroblocks 12 are encoded one macroblock at a time beginning from left to right within each image frame 10. Similarly, the blocks 14 are encoded one block at a time beginning from left to right within each macroblock 12. For clarity purposes, the encoding, or scanning, order of the blocks 14 in the macroblock 12 is numbered 1–16 in ascending order.

This block scanning order, however, does not take into account the availability (or lack thereof) of neighboring macroblocks for prediction purposes. As mentioned previously, the high degree of content redundancy within an image frame and between consecutive image frames allows a block to be extrapolated or predicted based on the surrounding or neighboring blocks. More specifically, the redundancy allows for prediction of pixels or of DCT coefficients or other transform coefficients that are used in the encoding scheme to represent the color and luminance of the pixels in the blocks. The motion of the pixels may also be predicted based on this redundancy. In general, the larger the amount of information that can be used for prediction, the more accurate the prediction of the pixels in a block will be, and hence the residual prediction error will be smaller and cheaper to encode, resulting in higher compression ratio and higher quality of the transmitted video.

With inter-coding schemes, prediction is based on the entire previously encoded image frames. With intra-coding schemes, however, only the previously encoded macroblocks within the same image frame or within the same segment of a segmented image frame are available, e.g., those macroblocks that are located above or to the left of the same row of the macroblock currently being encoded. However, not all macroblocks have the same number of neighboring macroblocks. Indeed, in some cases there are no blocks available above or to the left of the macroblock being encoded. For these macroblocks, therefore, it is desirable to be able to adjust the block scanning order so as to maximize the prediction utility of any previously encoded macroblocks that may be available.

Some prior art methods, such as that which appears to be disclosed in European patent No. EP-836328, adapt the scanning order of the DCT coefficients after detecting the image edges within the picture. Other prior art methods, such as that which appears to be disclosed in U.S. Pat. No. 4,951,157 and Japanese Patent No. 01177786, try to reduce the block boundary effects by using certain symmetrical scanning orders.

Yet other prior art methods, such as that which is described in a proposed addition Annex V of ITU-T Recommendation H.263, use a fixed, modified scanning order for motion vectors for all blocks when a certain data partitioned slice mode is used.

However, these prior art methods fail to maximize the prediction utility of any previously encoded blocks that may be available by adjusting the scanning order of the blocks.

A more complete appreciation of the present invention and the scope thereof can be obtained from the accompanying drawings (which are briefly summarized below), the following detailed description of the presently-preferred embodiments of the invention, and the appended claims.

SUMMARY OF THE INVENTION

The present invention is directed to a method or an apparatus for maximizing the prediction utility of previously encoded macroblocks by adjusting the scanning order of the blocks within a macroblock to be encoded. Where no previously encoded blocks are available above the macroblock being encoded, the alternative scanning orders allow for maximum utility of previously encoded blocks located to the left of the macroblock being encoded. Where no previously encoded blocks are available either above or to the left of the macroblock being encoded, the alternative scanning orders allow for maximum utility of information from blocks that are presently being encoded in the same macroblock. The particular scanning order used may be signaled implicitly based on the location of the macroblock being encoded, or it may be signaled explicitly by code words within the bitstream containing the encoded block information. In the case where the scanning order is to be signaled explicitly by a code word, the optimal scanning order may be chosen from among one or more scanning orders for any particular picture and macroblock.

In one aspect, the invention is related to a method for improving coding efficiency in a video signal encoding protocol. The method comprises dividing a video signal into a plurality of macroblocks to be encoded, each macroblock containing a plurality of blocks, determining a block scanning order for each of the macroblocks to be encoded based on any previously encoded macroblocks adjacent thereto, and encoding the plurality of macroblocks in accordance with the determined block scanning order.

In another aspect, the invention is related to a system for encoding a video signal. The system comprises a block converter for dividing the video signal into a plurality of macroblocks to be encoded, each macroblock containing a plurality of blocks, a block scanner for determining a block scanning order for each of the macroblocks to be encoded based on any previously encoded macroblocks adjacent thereto, and an encoder for encoding the plurality of macroblocks in accordance with the determined block scanning order.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As mentioned previously, with intra-coding schemes, only the previously encoded macroblocks located within the same image frame are available to be used for prediction. One of the reasons for using intra-coding is to prevent prediction inaccuracies in one image frame from propagating to another image frame. Other reasons for using intra-coding are well known to those of ordinary skill in the art and will not be documented here.

Figure 1:
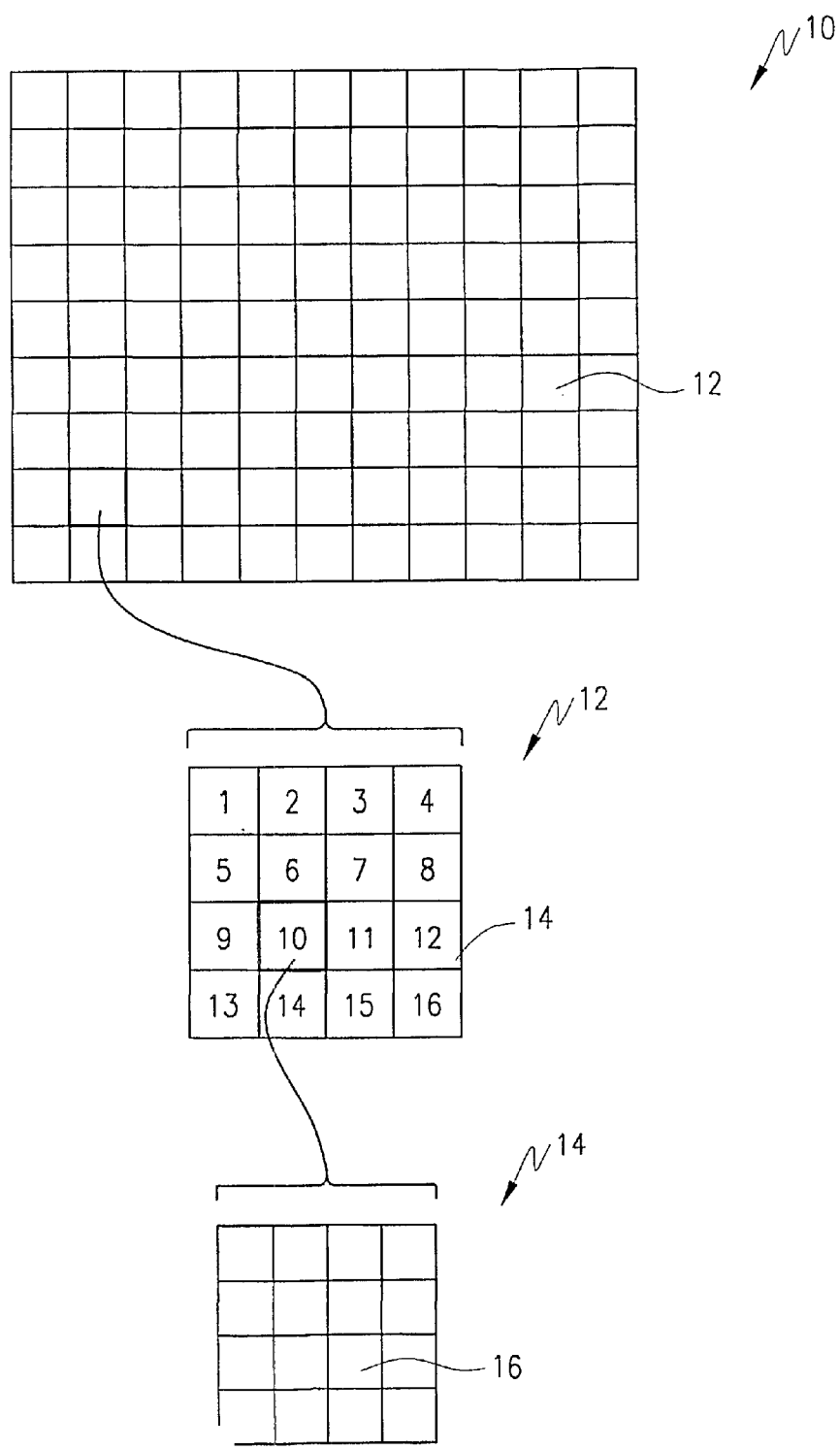
FIG. 1 illustrates a prior art format for a video image frame.
Figure 2:
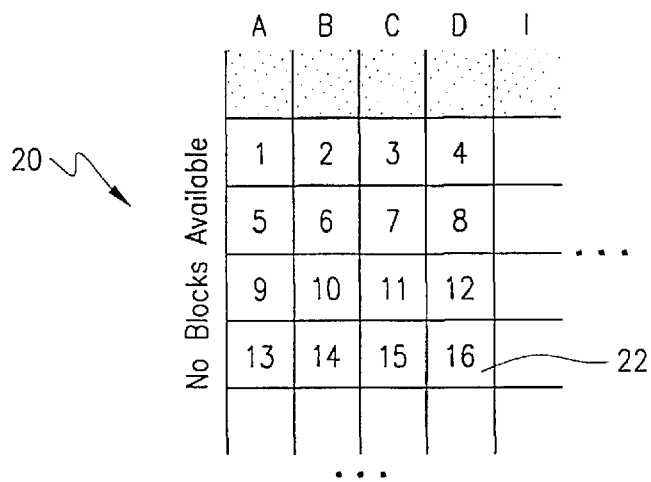
FIG. 2 illustrates an exemplary block scanning order according to one embodiment of the present invention.

Referring now to FIG. 2, a macroblock 20 defining a region of 4×4 blocks 22 to be encoded is shown. Located above the macroblock 20 are previously encoded blocks A, B, C, and D (shaded area) from a neighboring macroblock within the same image frame, and previously encoded block I from another neighboring macroblock within the same image frame. There are no macroblocks available to the left of the macroblock 20 for prediction purposes as it lies along the left edge of the image frame or image segment. Located to the right and below the macroblock 20 are blocks from several yet to be encoded neighboring macroblocks within the same image frame.

The particular block scanning order of the macroblock 20 in this exemplary embodiment is left to right and top to bottom, as indicated by the numbers 1–16 in ascending order. In other words, the blocks 22 are encoded one by one going from left to right, and the rows of blocks 22 are encoded row by row going from top to bottom. This is the default scanning order for most presently available video coding schemes. As can be seen, this default scanning order is also the best scanning order for this particular macroblock 20 as it maximizes the utility of the previously encoded blocks that are available for prediction purposes. Each block in the macroblock 20 has or will have at least two previously encoded neighboring blocks upon which predictions may be based. For example, the block bearing the number 1 has previously encoded blocks A and B as neighboring blocks from which predictions may be made.

Figure 3:
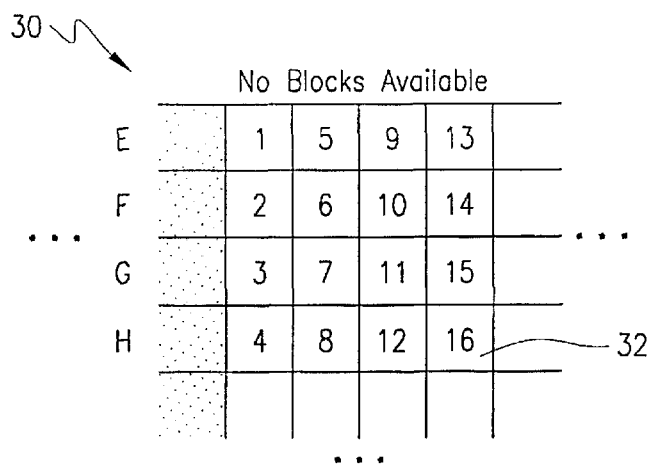
FIG. 3 illustrates another exemplary block scanning order according to another embodiment of the present invention.

Referring now to FIG. 3, another macroblock 30 defining an area of 4×4 blocks 32 to be encoded is shown. The macroblock 30 is similar to the macroblock 20 in FIG. 2 with the exception that it is located along the top edge of the image frame or in the first row of an image segment within the image frame. Therefore, there are no blocks available above the macroblock 30 to be used for prediction purposes. However, located to the left of the macroblock 30 are previously encoded blocks E, F, G, and H (shaded area) from a neighboring macroblock within the same image frame. As can be seen, the default scanning order of left to right and top to bottom would not be the best scanning order to use for the macroblock 30. For example, while the first block in the first row has previously encoded neighboring blocks E and F available from which predictions may be made, the second block in the first row would only have one previously encoded neighboring block available, namely, the first block in the first row. Accordingly, an alternative block scanning order is needed to maximize the utility of the previously encoded blocks E, F, G, and H that are available.

In another exemplary embodiment of the present invention, an alternative scanning order for the macroblock 30 that will maximize the available previously encoded information for prediction purposes may be top to bottom and left to right, as indicated by the numbers 1–16 in ascending order. In other words, the blocks 32 are encoded one by one going from top to bottom, and the columns of blocks 32 are encoded column by column going from left to right. Under this arrangement, every block 32 within the macroblock 30 will have at least two previously encoded blocks available to be used for prediction purposes.

Figure 4:
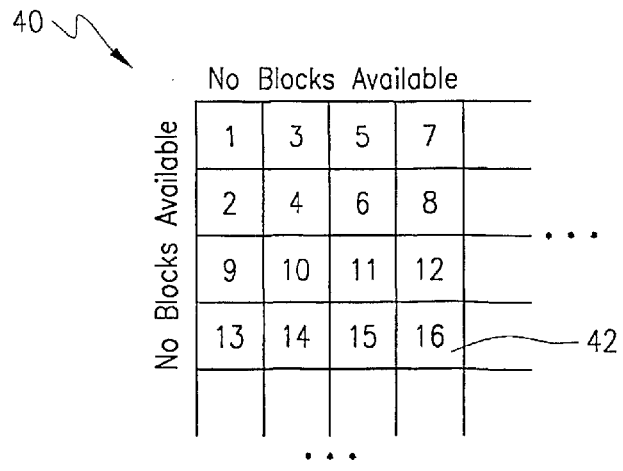
FIG. 4 illustrates yet another exemplary block scanning order according to yet another embodiment of the present invention.

Referring now to FIG. 4, yet another macroblock 40 defining an area of 4×4 blocks 42 to be encoded is shown. The macroblock 40 is similar to the macroblock 20 and the macroblock 30 shown in FIGS. 2 and 3, respectively, with the exception that it has no blocks located above or to the left thereof available for prediction purposes. Such a circumstance may occur, for example, at the top left corner of an image frame or if the image is divided into segments. Macroblocks that are positioned immediately after a segment marker may not have any neighboring macroblocks located above or to the left thereof for prediction purposes. In such a case, neither of the block scanning orders of the embodiments in FIG. 2 or 3 figures to be the best scanning order because both scanning orders will result in at least one block 42 having no previously encoded blocks and 3 blocks 42 having only one previously encoded block available for prediction. Accordingly, still another block scanning order is needed to maximize the utility of any previously encoded blocks that may become available.

In another exemplary embodiment of the present invention, an alternative scanning order that will maximize the utility of any previously encoded blocks that may become available is, for the blocks 42 in the top half of the macroblock 40, top to bottom for each block and left to right for each column of blocks, then for the blocks 42 in the bottom half of the macroblock 40, left to right for each block and top to bottom for each row of blocks, as indicated by the numbers 1–16 in ascending order. Under this arrangement, one block 42 will have no previously encoded neighboring blocks and one block 42 will have a single previously encoded neighboring block, but each of the remaining blocks 42 will have at least two previously encoded neighboring blocks.

Although not expressly shown, another scanning order that will produce essentially the same results for the macroblock 40 is, for the blocks 42 in the left half of the macroblock 40, left to right for each block and top to bottom for each row of blocks, then for the blocks 42 in the right half of the macroblock 40, top to bottom for each block and left to right for each column of blocks.

It should be noted that, although the scanning order described above were for the case of a macroblock containing 4×4 blocks, each block having 4×4 pixels, the invention may also be applied to other macroblocks having, for example, 2×2 blocks, each block having 8×8 pixels.

Figure 5:
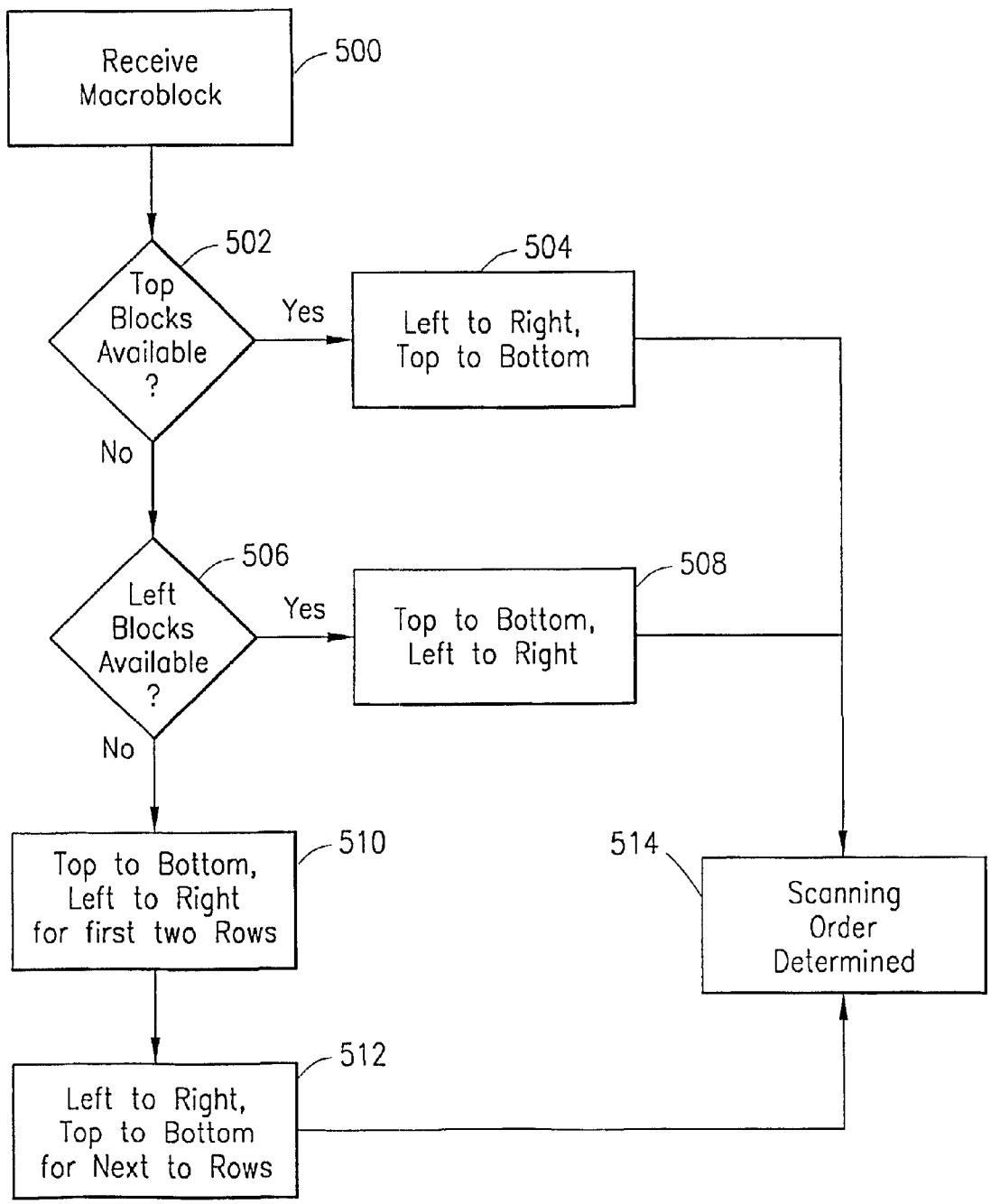
FIG. 5 illustrates a flowchart of a method according to the present invention.

Selection of the block scanning order may be better understood with reference to the exemplary flowchart illustrated in FIG. 5. Upon receiving the macroblock to be encoded at step 500, it is determined at step 502 whether any blocks above are available for prediction purposes. If there are, then the scanning order selected at step 504 is the default scanning order of left to right and top to bottom. If there are no blocks available above, then it is determined at step 506 whether there are any blocks available to the left for prediction purposes. If there are, then the scanning order selected at step 508 is top to bottom and left to right. If there are no blocks available to the left, then the scanning order selected at step 510 is top to bottom and left to right for the first two rows, then left to right and top to bottom for the next two rows at step 512. Once the block scanning order has been determined, then the selection process is concluded at step 514.

Figure 6:
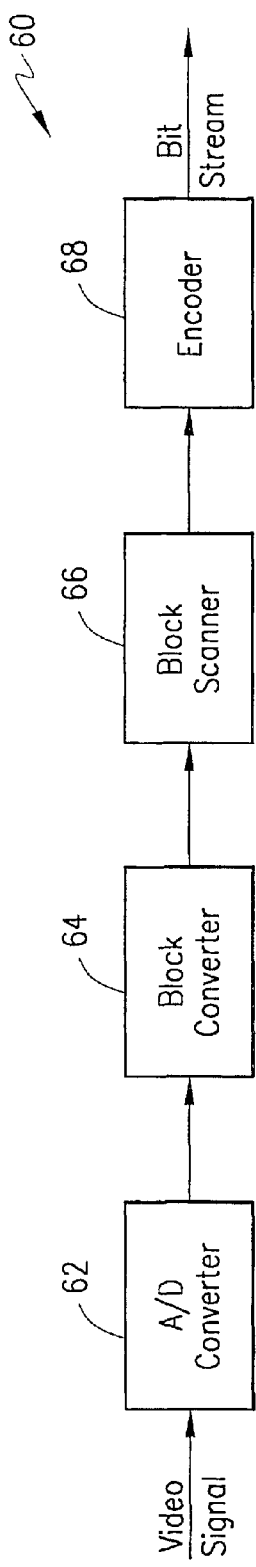
FIG. 6 illustrates a functional block diagram of a video signal compressor according to an embodiment of the present invention.

FIG. 6 illustrates a functional block diagram of a video signal compressor 60 according to one exemplary embodiment of the present invention. The compressor 60 includes an analog to digital converter 62 which converts the received video signal from analog to digital. The digitized video signal is then converted by a block converter 64 into an image frame having macroblocks and blocks. The image frame thus partitioned into macroblocks and blocks is processed by a block scanner 66 to determine the best block scanning order to be used to with a particular macroblock. In a preferred embodiment, the block scanner 66 uses the block scanning order selection process previously described in connection with FIG. 5. An encoder 68 then encodes the image frame based, in part, on the predictions made for each macroblock in accordance with the selected block scanning order.

In another exemplary embodiment, instead of using the selection process shown in FIG. 5, the block scanner 66 may select the block scanning order based on other factors such as block sizes (if several sizes are available) and macroblock types (e.g., inter and intra macroblocks).

In yet another embodiment, the block scanner 66 presents two or more possible scanning orders for a particular macroblock to be encoded. Then, the encoder 68 selects the scanning order it determines as providing the highest prediction accuracy based on the specific image content of the image frames and/or macroblocks therein. The encoder 68 then includes the selected scanning order as an explicit codeword in the resulting bitstream.

Figure 7:
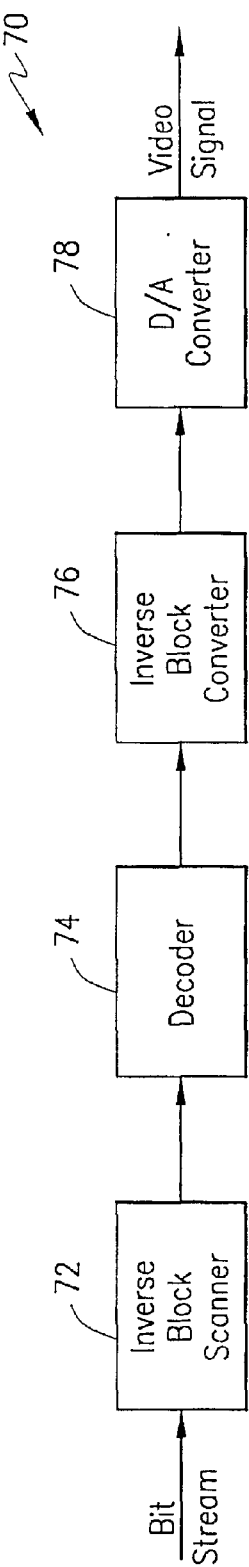
FIG. 7 illustrates a functional block diagram of a video signal decompressor according to an embodiment of the present invention.

Referring now to FIG. 7, a functional block diagram of the decompressor 70 is shown. The decompressor 70 includes an inverse block scanner 72 which receives the bitstream produced by the compressor 60. In a preferred embodiment, the inverse block scanner 72 predicts which block scanning order is to be used based upon the location and surrounding of the macroblock to be decoded within an image frame. Note that the decompressor 70 will have access to and be able to use the same information regarding the macroblock location and surroundings as the compressor 60. In an alternative embodiment, the inverse block scanner 72 determines which block scanning order is to be used with a particular macroblock based on code words explicitly included in the bitstream. A decoder 74 converts the bitstream into image frames based in part on the predictions made for each macroblock in accordance with the selected block scanning order. An inverse block converter 76 converts the image frames from blocks and macroblocks into a digitized video signal. Finally, a digital to analog converter 78 converts the digitized video signal back into its original form.

Although the invention has been described with reference to specific embodiments, various modifications and alternatives exist which were not described, but which are within the scope and spirit of the invention. Accordingly, the invention should be limited by only the following claims.

What is claimed is:

1. A method for improving coding efficiency in a video signal encoding protocol, said method comprising:

dividing a video signal into a plurality of macroblocks to be encoded, each macroblock containing a plurality of blocks therein;

selecting a block scanning order for the blocks within each of the macroblocks to be encoded, wherein the selected block scanning order maximizes the prediction utility of previously encoded macroblocks, said selecting step including the steps of:

selecting as the next block in the scanning order, a candidate block which has a previously encoded macroblock directly above the candidate block;

selecting as the next block in the scanning order, a candidate block which has a previously encoded macroblock directly to the left of the candidate block if a previously encoded macroblock is not directly above any of the candidate blocks; and selecting as the next block in the scanning order, a candidate block that maximizes the prediction utility of previously encoded blocks in the macroblock currently being encoded if a previously encoded macroblock is neither directly above nor directly to the left of any of the candidate blocks; and encoding the plurality of blocks within each of the macroblocks in accordance with the selected block scanning order.

2. The method according to claim 1, further comprising transmitting said encoded plurality of macroblocks.

3. The method according to claim 2, wherein said transmitting step also includes transmitting information indicative of the selected block scanning order.

4. The method according to claim 2, further comprising decoding said encoded plurality of macroblocks.

5. The method according to claim 4, wherein said decoding step is based on information indicative of said selected block scanning order.

6. The method according to claim 4, wherein said decoding step takes place without information indicative of said selected block scanning order.

7. The method according to claim 1, further comprising placing code words within the information being encoded, said code words indicating a particular block scanning order for each macroblock to be encoded.

8. The method according to claim 7, further comprising selecting another block scanning order for each macroblock to be encoded in accordance with one of the code words.

9. The method according to claim 1, wherein the step of selecting as the next block in the scanning order, a candidate block that maximizes the prediction utility of previously encoded blocks in the macroblock currently being encoded includes the steps of:

selecting as the first block in the scanning order, the block in the upper left-hand corner of the macroblock;

selecting as the second block in the scanning order, the block directly below the first block;

selecting as the third block in the scanning order, the block directly to the right of the first block;

selecting as the fourth block in the scanning order, the block directly below the third block;

selecting as the fifth block in the scanning order, the block directly to the right of the third block;

selecting as the sixth block in the scanning order, the block directly below the fifth block;

selecting as the seventh block in the scanning order, the block directly to the right of the fifth block; and selecting as the eighth block in the scanning order, the block directly below the seventh block.

10. The method according to claim 9, wherein the step of selecting as the next block in the scanning order, a candidate block that maximizes the prediction utility of previously encoded blocks in the macroblock currently being encoded also includes the steps of:

selecting as the ninth through the twelfth blocks in the scanning order, the blocks directly below the second, fourth, sixth, and eighth blocks, respectively; and selecting as the thirteenth through the sixteenth blocks in the scanning order, the blocks directly below the ninth through the twelfth blocks, respectively.

11. A method for improving coding efficiency in a video signal encoding protocol, said method comprising:

dividing a video signal into a plurality of macroblocks to be encoded, each macroblock containing a plurality of blocks therein;

selecting a block scanning order for each of the macroblocks to be encoded, wherein the selected block scanning order is top to bottom for each block and left to right for each column of blocks for two rows of blocks, then left to right for each block and top to bottom for each row of blocks for another two rows of blocks; and encoding the plurality of macroblocks in accordance with the selected block scanning order.

12. A method for improving coding efficiency in a video signal encoding protocol, said method comprising:

dividing a video signal into a plurality of macroblocks to be encoded, each macroblock containing a plurality of blocks therein;

selecting a block scanning order for each of the macroblocks to be encoded, wherein the selected block scanning order is left to right for each block and top to bottom for each row of blocks for two columns of blocks, then top to bottom for each block and left to right for each column of blocks for another two columns of blocks; and encoding the plurality of macroblocks in accordance with the selected block scanning order.

13. A system for encoding a video signal, comprising:

a block converter for dividing the video signal into a plurality of macroblocks to be encoded, each macroblock containing a plurality of blocks therein;

a block scanner for selecting a block scanning order for the blocks within each of the macroblocks to be encoded, wherein the selected block scanning order maximizes the prediction utility of previously encoded macroblocks, said block scanner including:

means for selecting as the next block in the scanning order, a candidate block which has a previously encoded macroblock directly above the candidate block;

means for selecting as the next block in the scanning order, a candidate block which has a previously encoded macroblock directly to the left of the candidate block if a previously encoded macroblock is not directly above any of the candidate blocks; and means for selecting as the next block in the scanning order, a candidate block that maximizes the prediction utility of previously encoded blocks in the macroblock currently being encoded if a previously encoded macroblock is neither directly above nor directly to the left of any of the candidate blocks; and an encoder for encoding the plurality of blocks within each of the macroblocks in accordance with the selected block scanning order.

14. The system according to claim 13, wherein said encoder transmits said encoded plurality of macroblocks.

15. The system according to claim 14, wherein the encoder also transmits information indicative of the selected block scanning order.

16. The system according to claim 13, further comprising a decoder for decoding said encoded plurality of macroblocks.

17. The system according to claim 16, wherein said decoder decodes said plurality of encoded macroblocks based on information indicative of said selected block scanning order.

18. The system according to claim 16, wherein said decoder decodes said plurality of encoded macroblocks without any information indicative of said selected block scanning order.

19. The system according to claim 13, further comprising means for placing code words within the information being encoded, said code words indicating a particular block scanning order for each macroblock to be encoded.

20. The system according to claim 19, wherein said block scanner selects another block scanning order for each macroblock to be encoded in accordance with one of the code words.

21. A system for encoding a video signal, comprising:

a block converter for dividing the video signal into a plurality of macroblocks to be encoded, each macroblock containing a plurality of blocks therein;

a block scanner for selecting a block scanning order for each of the macroblocks to be encoded, wherein the selected block scanning order is top to bottom for each block and left to right for each column of blocks for two rows of blocks, then left to right for each block and top to bottom for each row of blocks for another two rows of blocks; and an encoder for encoding the plurality of macroblocks in accordance with the selected block scanning order.

22. A system for encoding a video signal, comprising:

a block converter for dividing the video signal into a plurality of macroblocks to be encoded, each macroblock containing a plurality of blocks therein;

a block scanner for selecting a block scanning order for each of the macroblocks to be encoded, wherein the selected block scanning order is left to right for each block and top to bottom for each row of blocks for two columns of blocks, then top to bottom for each block and left to right for each column of blocks for another two columns of blocks; and an encoder for encoding the plurality of macroblocks in accordance with the selected block scanning order.

* * * * *